US012669469B2

(12) United States Patent
Golias et al.

(10) Patent No.: US 12,669,469 B2
(45) Date of Patent: Jun. 30, 2026

(54) BLOTTER PAD FOR ELECTROPHORESIS

(71) Applicant: HELENA LABORATORIES CORPORATION, Beaumont, TX (US)

(72) Inventors: Tipton L Golias, Beaumont, TX (US); Dylan Guzman, Evadale, TX (US); Emily Smith, Port Arthur, TX (US)

(73) Assignee: HELENA LABORATORIES CORPORATION, Beaumont, TX (US)

( * ) Notice: Subject to any disclaimer, the term of this patent is extended or adjusted under 35 U.S.C. 154(b) by 537 days.

(21) Appl. No.: 18/016,614

(22) PCT Filed: Aug. 16, 2021

(86) PCT No.: PCT/US2021/046084
§ 371 (c)(1),
(2) Date: Jan. 17, 2023

(87) PCT Pub. No.: WO2022/040062
PCT Pub. Date: Feb. 24, 2022

(65) Prior Publication Data
US 2023/0296557 A1     Sep. 21, 2023

Related U.S. Application Data

(60) Provisional application No. 63/067,798, filed on Aug. 19, 2020.

(51) Int. Cl.
*G01N 1/00*     (2006.01)
*G01N 27/447*     (2006.01)
(52) U.S. Cl.
CPC .............................. *G01N 27/44739* (2013.01)

(58) Field of Classification Search
None
See application file for complete search history.

(56) References Cited

U.S. PATENT DOCUMENTS 5,869,272 A * 2/1999 Bogart ............. G01N 33/56927
436/805
2016/0178625 A1 6/2016 Scott

FOREIGN PATENT DOCUMENTS

WO          97/036170          10/1997

OTHER PUBLICATIONS

Yoshida et al "A Versatile Apparatus for electrophoresis including isoelectric focusing and its performances" Analytical Chemistry, Academic Press, Amsterdam, NL, vol. 129, No. 1, Feb. 15, 1983, pp. 37-45.
Sederel L C et al "Grafting of a synthetic heparinoid polyelectrolyte onto silicone rubber" Biomaterials, Elsevier, NL, vol. 4, No. 3, Jul. 1, 1983, pp. 210-214.
Interntional Search Report for PCT/US2021/016984 dated Nov. 9, 2021.
International Written Opinion for PCT/US2021/016984 dated Nov. 9, 2021.

* cited by examiner

*Primary Examiner* — Jyoti Mutreja
(74) *Attorney, Agent, or Firm* — Jerold I Schneider; SCHNEIDER IP LAW

(57)          ABSTRACT

A blotter assembly for use in electrophoresis comprising a block and a closed cell silicone blotter pad adhesively attached thereto and restricted against accidental movement relative thereto.

5 Claims, 4 Drawing Sheets

BLOTTER PAD FOR ELECTROPHORESIS

BACKGROUND

Electrophoresis is one of the most common methods of separating proteins, nucleotides and other biological macromolecules. Methods vary depending in the medium being used (e.g., agarose, acrylamide, cellulose, capillary) and chemical interactions used during the process (e.g., capillary zone, immunofixation, immuno-subtraction, etc.). While there are many different types of electrophoresis, all separate a sample into its individual constituents by applying electric voltage across a medium into which a sample is placed. The electrophoretic mobility of a molecule depends on the type of medium used, pH, and the characteristics of each molecule such as its size, shape, charge and interactions with other molecules in medium selected.

In the simplest form of electrophoresis, the macromolecules of a sample are separated across a gel or other medium, a stain is applied, revealing a sample separation profile of bands of each distinct constituent of the sample. The densities and width of these bands are measured and used as quantitative and/or qualitative measurements of the various macromolecules in a sample. In some instances, a single band includes signals from several similar but distinct macromolecules. Further identification and characterization of macromolecules generating a signal within each band can be achieved by removing selected bands and performing further diagnostic tests.

Serum Protein Electrophoresis (SPE) and Immunofixation Electrophoresis (IFE) are among the oldest clinical diagnostic tools in wide use today. Generally, SPE and/or IFE may be performed on a sample of blood from a patient with little or no preparation of the sample itself. A sample may be placed directly into a well in an agarose gel, which may be run an appropriate amount of time, stained with Coomassie blue or other common protein stain, and protein separation profile, comprising characteristic bands of serum proteins are readily observed. In some cases, the sample may be first diluted or treated to avoid clotting, but otherwise no preparation is required. The separation pattern resulting from SPE depends on the fractions of two major types of proteins: albumin and globulins that are present in the sample. Both the albumin and globulin bands contain signals from many similar but distinct proteins.

The gamma region of an SPE is primarily composed of immunoglobulins also referred to as antibodies. Plasma cells produce immunoglobulins (also called gamma-globulins), which consist of a heavy chain (IgG, IgA, IgM, IgD or IgE) and a light chain (kappa or lambda) linked together. The patient sample may be placed in multiple zones or lanes on an agarose gel plate and then, after the electrophoresis step, different antisera is deposited in the different lanes and the antisera-antibody reaction occurs indicating the presence and quantity of the antibodies in the sample. Stains may be used to visualize the reaction.

Inherent in the above processes is the need to remove excess liquid, it being understood that the term "liquid" is used in this context to refer individually and collectively to patient samples, including the components of those samples, substances used to dilute the samples, stains, antisera, and stain removers, as well as substances used to remove excess and/or unreacted samples, components of those samples, stains and stain removers. The presence of excess "liquids" may interfere with the qualitative and quantitative analysis of the results. In addition, the excess liquids must be removed from the electrophoresis and/or IFE equipment after completion of the test so that a subsequent test may be performed. Increase in the amount of excess liquid removal during the electrophoresis and immunofixation steps, for example, results in less liquid remaining to be removed between successive tests.

Historically, blotters have been used to absorb and thus remove excess liquid from electrophoresis gel plates. The blotters, or more accurately blotting paper, is sometimes referred to as bibulous paper, a highly absorbent type of paper or other material that absorbs an excess of liquid substances from another surface. Frequently cotton is used in the manufacture of blotting paper.

In prior electrophoresis procedures, strips of blotting paper have been manually placed on an agarose gel, allowed to remain in place for a desired length of time to absorb excess liquid, and then manually removed. In addition, to enhance the absorption of liquids, extra weight in the form of a physical blocks have been placed on the blotting paper in some systems. These blocks provide benefits such as maintaining contact between the blotter and the gel to increase the rate of absorption, increase the amount of absorption, prevent curling of the blotter away from the gel surface and, by virtue of the weight, distribute a more uniform downward force on the blotter. Examples of the use of a gel block and blotter are known and used, for example, with the TITAN® GEL Immunofixation procedure and the SPIFE® IgG procedure both marketed by Helena Laboratories Corporation of Beaumont, Texas, U.S.A., the applicant of the present improved Blotter Pad For Electrophoresis invention.

The use of blotters and the prior art blocks have several limitations including but not limited to (a) difficulty in removing the blotter paper after use since pieces of the blotter paper may adhere to the block, (b) undesired movement between the blotter paper and the block as the block is placed on the blotter paper which had previously been placed on the gel, and (c) uneven distribution of the weight of the block on the blotter paper and thus uneven distribution of the weight of the block and blotter paper on the gel. The use of the prior art blotter paper has limitations because of the manual nature of the blotting operation.

SUMMARY

The improved blotter pad for electrophoresis is a multipart assembly that allows for fixing or attaching a pad to a blotter block, fixing or attaching blotter to the pad, and assists in distribution of the weight on the blotter paper and gel, thus avoiding undesired movement between the blotter paper and the blotter pad and undesired movement between the blotter paper and the gel, and provides for easy and complete removal of the blotter paper from the pad after completion of the blotting step.

The improved blotter pad for electrophoresis further includes a removable adhesive backing so that the blotter pad may be removed from the blotter block, if necessary, and a replacement blotter pad may be attached to the blotter block. The improved blotter pad for electrophoresis functions with an improved blotter paper that includes an adhesive backing so that the blotter paper is maintained in position against accidental movement yet may be easily removed and replaced with dry blotter paper since blotter paper is typically used only one time.

BRIEF DESCRIPTION OF THE FIGURES

The benefits of the improved blotter block and pad for electrophoresis and the improved blotter paper, as just described, together with other benefits and advantages that may be attained by its use, will become more apparent upon reading the following detailed description taken in conjunction with the drawings. In the drawings.

DETAILED DESCRIPTION

Figure 1:
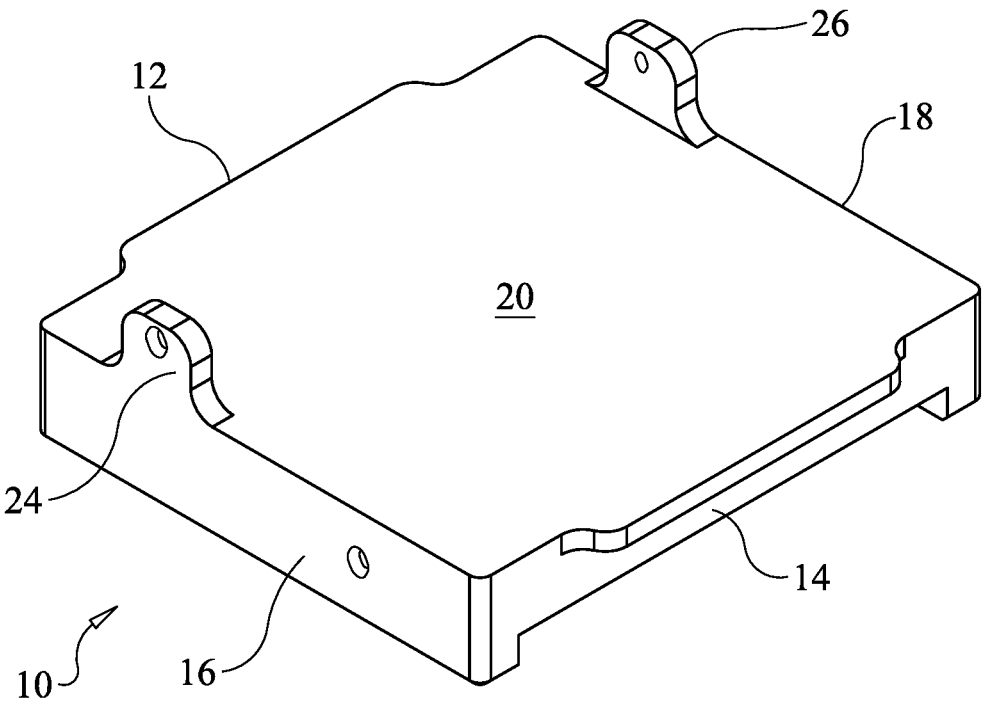
FIG. 1 is a perspective illustration of a blotter block when viewed from the top.
Figure 2:
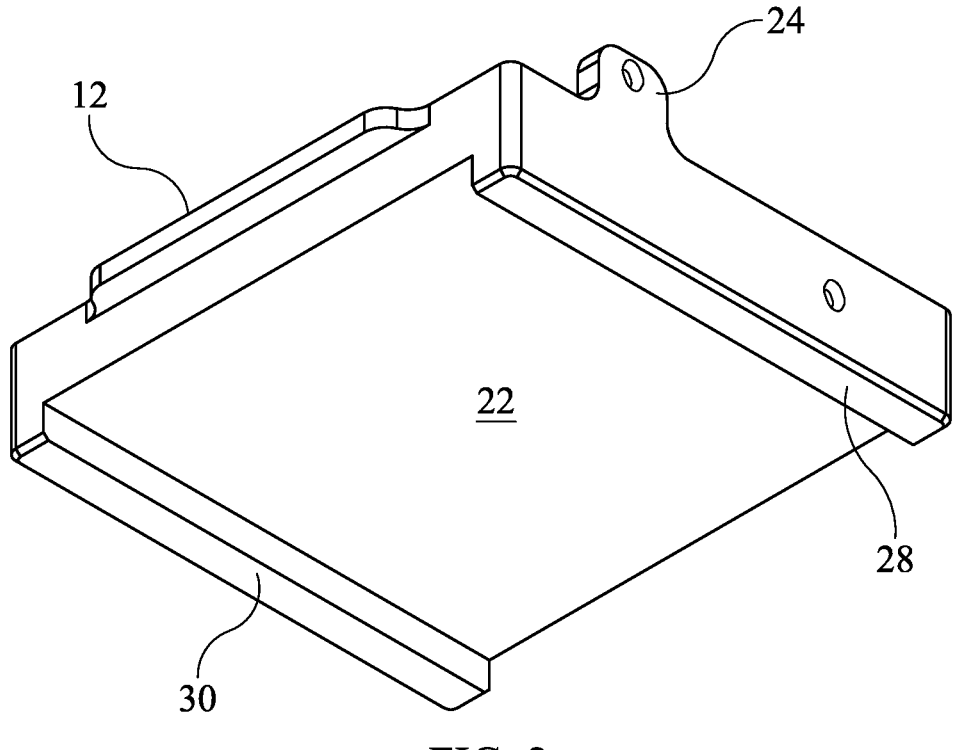
FIG. 2 is a perspective illustration of the blotter block of FIG. 1 when viewed from the bottom.

In the following description and the explanation of the drawings, the various length and width dimensions are for illustrative purposes only. The dimension are provided in relation to the "gel area" on an electrophoretic gel where patient samples are deposited, electrophoresed, reagents deposited, and stains deposited. The dimensions are also illustrative and non-limiting to compensate for the size of the equipment used in the electrophoresis system. Thus, as a non-limiting example, in the use of the SPIFE Nexus equipment manufactured by Helena Laboratories Corporation of Beaumont, Texas (U.S.A.) a typical gel area for one patient is of rectangular configuration and approximately 11.43×12.7 cm (4.5×5.0 inches). The blotter paper must be of a greater length and width than the gel area. The blotter block and blotter pad must be of greater length and width than the blotter paper. Again, the use of a rectangular gel area is for illustrative purposes only.

An improved blotter block 10 is thus illustrated as being of generally rectangular configuration having two opposed shorter sides 12, 14 and two opposed longer sides 16, 18. The length and width of the blotter block are approximately 13.34×14.99 cm (5.25×. 5.90 inches), i.e., larger in both length and width than the patient sample gel area.

The blotter block 10 has an upper surface 20 and a lower surface 22. As previously explained, the precise dimensions may be varied based on the nature of the machine used in the electrophoresis system. The size, shape, proportions and materials described in this paragraph as well as in the following paragraphs, should be understood as solely explanatory and non-limiting. The upper surface 20 of the blotter block may include upwardly extending projections 24, 26 on opposed sides 16, 18 of the block, and positioned closer to the shorter side 12. These projections facilitate the use of a machine such as the SPIFE Nexus referred to above to lift and move the blotter pad. Other lifting and maneuvering methods and systems may be used such as, but not limited to, a system using magnetic coupling. What is important is that the blotter block 10 may be inverted for removal of used blotter paper and replacement with fresh blotter paper, as will be described below, and for the movement of the base among various gel areas on an electrophoresis plate so that multiple samples may be blotted sequentially, each with fresh, i.e., unused, blotter paper to avoid contamination as between samples of different patients.

The underside 22 of the blotter block 10 includes elongated raised portions 28, 30 parallel to each other. Each raised portion extends substantially the full length of the block from the first end 12 to the second end 14 and are adjacent the sides 16, 18 respectively. The raised portions assist in proper alignment of a blotter pad and blotter paper as will be explained.

In the non-limiting example being described, the gel plate contact area of the underside 22 of the blotter block 10, excluding the area encompassed by the raised portions 28, 30, is approximately 12.7×. 13.2 cm (5.0×. 5.2 inches).

Preferably the blotter block may be formed of stainless steel and may weigh approximately 3.18 kg (7 pounds). This weight assists in the natural wicking nature of the blotter paper so that the correct amount of excess liquid on the agarose (or other) gel may be absorbed without causing damage to the patient samples and/or the surface of the gel plate.

More generally, with a gel plate contact area of approximately 13.34×14.99 cm, which is approximately 199.84 $cm^2$, the effective weight (force) of the gel block on the gel plate is 15.89 $gm/cm^2$.

Figure 3:
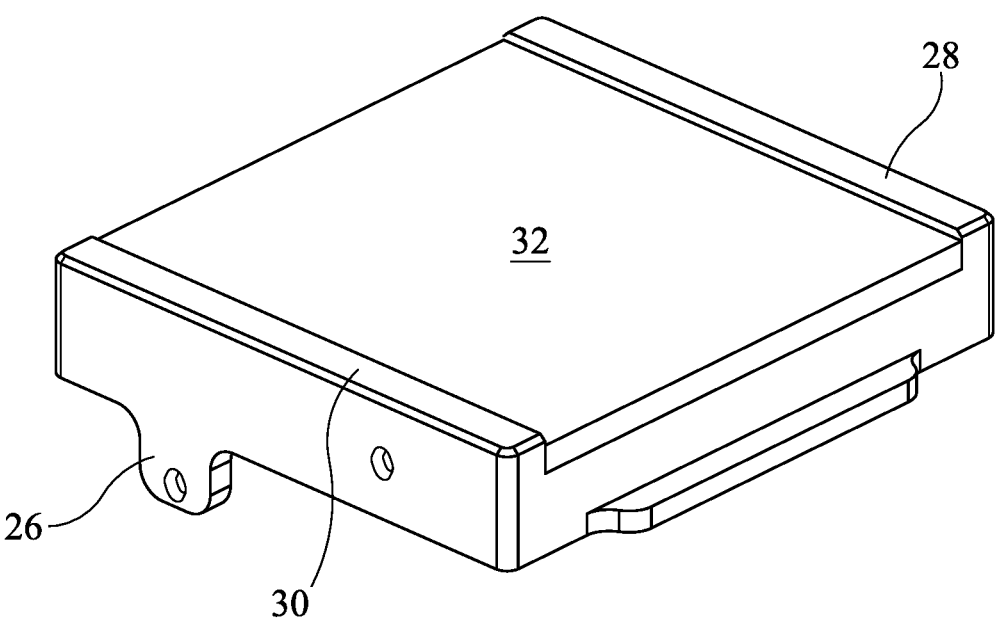
FIG. 3 is another perspective illustration of the blotter block of FIG. 1 including a blotter pad.
Figure 4:
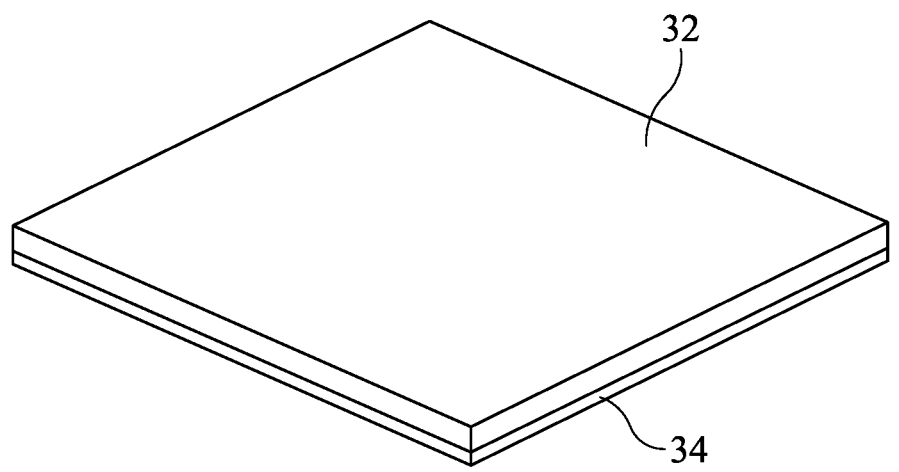
FIG. 4 is a perspective illustration of a blotter pad.

Referring next to FIGS. 3 and 4, the blotter pad further includes a thin cushion foam layer 32 preferably of the same general configuration or shape, such as rectangular, as the gel contact area of the underside 22 of the blotter block 10. The length and width of the foam layer are preferably slightly less than the length and width of the underside of the block, for example, 13.21×12.7 cm (5.0×5.2 inches) although larger than the length and width of the gel plate patient area. The foam layer is preferable a closed cell silicone rubber foam with a thickness of approximately 0.48 cm (0.1875 inches). The closed cell foam layer 32 preferably has an acrylic adhesive backing on one side and, in FIG. 4, is illustrated as being covered with a conventional release paper 34. The release paper is removed when it is desired to attach the foam layer 32 to the underside of the blotter block 10 between the raised projections 28, 30.

If desired, the foam cushion layer may be a double layer with one layer in contact with the blotter block 10. In this situation, the layer in contact with the underside of the blotter block 10 may be a PVC (polyvinyl chloride) foam.

Importantly, since the purpose of the layer 32 us to apply a suitable pressure to the patient gel area on the gel plate, the silicone rubber layer preferably has the same or less hardness than the electrophoretic gel, and functions to assist in distributing the weight of the blotter block 10 across the gel and equalizing the pressure (force) on the gel by conforming to the surface contour of the gel thus assisting in providing generally uniform blotting of the gel plate and protecting the gel plate from damage. The cushion layer 32 is preferably resistant to corrosion. When the cushion layer 32 is worn or damages, the cushion layer 32 may be removed from the underside of the blotter block 10, any remaining adhesive removed from the block 10, and a replacement cushion layer may be attached to the underside 22 of the block 10.

Another benefit of a corrosion resistant closed cell layer 32 is to protect the layer from damage as blotter papers are attached and removed as will be described further below.

Figure 5:
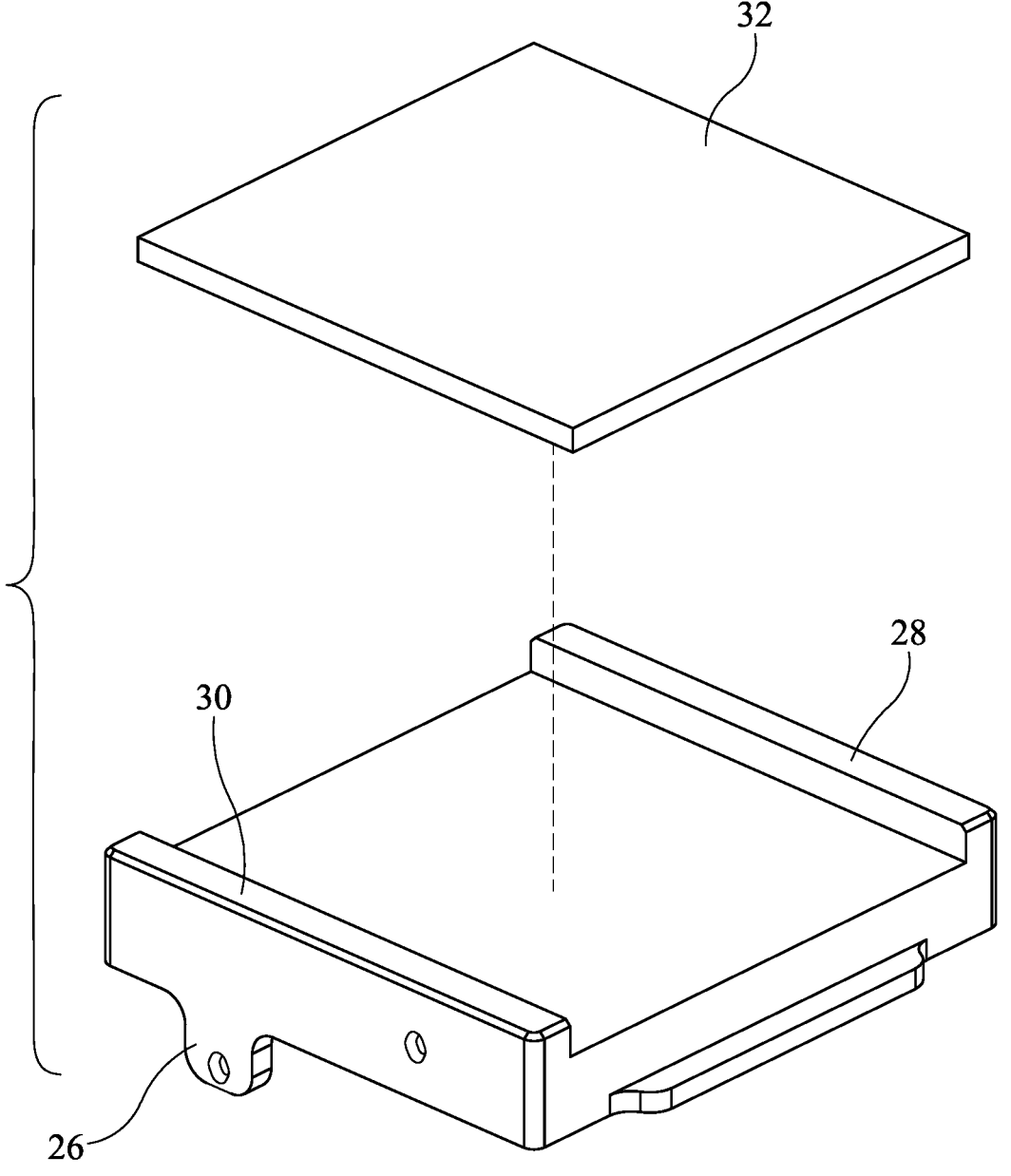
FIG. 5 is an exploded perspective illustration of a blotter block and blotter pad.

FIG. 5 is an exploded perspective illustration of a blotter block and blotter pad illustrating the placement of the blotter pad 32 on the underside 22 of the blotter block generally between the raised portions 28, 30.

Figure 6:
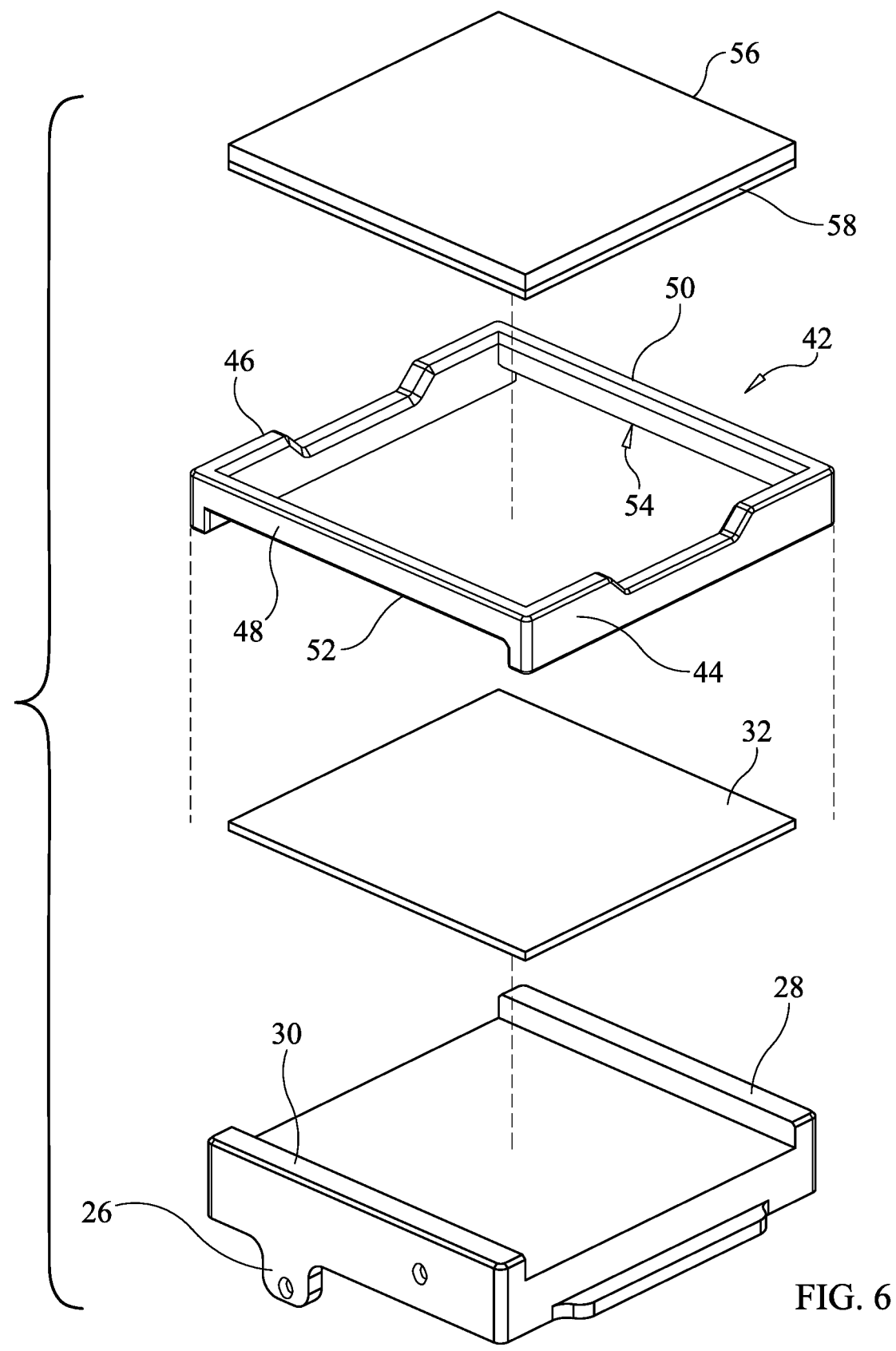
FIG. 6 is an exploded perspective illustration of a blotter block, blotter pad, blotter paper, and a fixture or jig for properly positioning the blotter paper on the blotter pad.

FIG. 6 is an exploded perspective illustration of applying blotter paper to the blotter block 10. A rectangular jig or fixture 42 has opposed shorter sides 44, 46 and opposed longer sides 48, 50. The sides 44, 46, 48 and 50 define an open rectangle. The sides 48, 50 of the jig or fixture includes recesses 52, 54 to be aligned relative to the projections 28, 30 on the underside of the blotter block 10. Alternatively, if desired, the jig or fixture may include projections and the underside 22 of the block 10 may include recesses to receive those projections.

Thus, any release paper on the underside of the cushion layer 32 is removed and the cushion layer is attached to the underside 22 of the blotter block 10 and retained in place by the adhesive portion of the cushion.

The jig and blotter block underside may be aligned with and/or engaged relative to each other before or after the cushion layer 32 is applied to the underside of the blotter block 10.

The open area of the jig or fixture 42 provides guidance for the proper location of the blotter paper. The blotter paper 56 includes adhesive on one side covered by a release paper 58. The blotter paper, in the non-limiting context of the gel plate patient area as described above, is slightly larger in both length and width than the patient area. Upon removal of the release paper, the blotter paper is inserted through the opening in the jig or fixture 42 and placed in contact with the cushion layer 32. A slight force is applied so that the blotter paper adheres to the closed cell cushion layer.

The absorption capacity of the blotter paper 56 may be increased by using two or more layers of blotter paper secured together by adhesive between the layers.

The adhesive layer or coating may be a double-sided adhesive tape with one side attached to the blotter paper 56. The side of the adhesive layer that is not attached to the blotter paper is typically covered with a release paper that may be silicone-based. Alternatively, in lieu of coating the entire underside surface of the blotter paper with adhesive, the underside surface of the blotter paper may have several portions of adhesive material each covered with release paper.

After use, the blotter paper 56 may be removed from the cushion layer 32 for example by starting from one corner of the blotter paper. Then another blotter paper is attached to the cushion layer as previously described. Once the blotter paper makes contact with the gel, and absorbs liquid, the blotter paper is removed. It is not used a second time and not used for a different patient gel area as any such use might cause contamination of, or cross-contamination between, patient gel areas.

One of the many benefits of the use of the blotter pad is that the adhesive-backed blotter 56 may be easily removed from the blotter pad 32 so that a replacement blotter with an adhesive backing may be used for a subsequent electrophoresis and/or immunofixation test. Another benefit is that any adhesive remaining on the cushion layer 32 may be easily removed and, if the cushion layer is damaged, the cushion layer may be easily removed and replaced. A third benefit is that through the use of adhesive the blotter pad does not move accidentally relative to the blotter block and the blotter paper does not move accidentally relative to the blotter pad and thus the patient sample on the gel plate is not contaminated or distorted as a result of the blotting step.

Each of the dimensions presented above are to be considered in the context of the patient gel area and are also to be considered as approximate dimensions ±10%.

The invention claimed is:

1. A blotter assembly for use in electrophoresis, comprising:

a blotter block with an upper surface and a lower surface, wherein:

the upper surface of the blotter block comprises a first and second upwardly extending projections on opposite sides of the blotter block; and the lower surface of the blotter block comprises a first and second elongated raised portions that are parallel to each other and extend along the length of the lower surface towards opposite edges of the blotter block;

a closed-cell silicone blotter pad configured to be removably attached by adhesive to the lower surface of the blotter block, wherein, when attached, the blotter pad is restrained against accidental movement relative to the blotter block; and a blotter paper configured to be removably attached by adhesive to the closed-cell silicone blotter pad, wherein:

the blotter paper is restrained against accidental movement relative to the closed-cell silicone blotter pad when the blotter paper is attached to the closed-cell silicone blotter pad; and the raised elongated portions of the blotter block are configured to assist in aligning the blotter paper relative to the closed-cell silicone blotter pad.

2. The blotter assembly according to claim 1, and further including a fixture adapted to align the blotter paper relative to the closed-cell silicone blotter pad.

3. A blotter assembly according to claim 1, wherein the blotter block exerts a force on the closed-cell silicone blotter pad between 14.3 gm/cm$^2$ to 17.5 gm/cm$^2$.

4. A method of blotting liquid from an electrophoresis gel plate using a blotter paper without unintentional movement of the blotter paper relative to the gel plate through use of the blotter assembly of claim 1.

5. A blotter assembly according to claim 1, wherein the blotter block exerts a force of 15.89 gm/cm$^2$ on the blotter pad.

\* \* \* \* \*